(12) United States Patent
Vergara

(10) Patent No.: US 10,820,522 B2
(45) Date of Patent: Nov. 3, 2020

(54) AGRICULTURAL MACHINE AND GROOVED SHAFT

(71) Applicant: DEERE & COMPANY, Moline, IL (US)

(72) Inventor: Daniel Vergara, Coslada (ES)

(73) Assignee: Deere & Company, Moline, IL (US)

(*) Notice: Subject to any disclaimer, the term of this patent is extended or adjusted under 35 U.S.C. 154(b) by 176 days.

(21) Appl. No.: 16/223,239

(22) Filed: Dec. 18, 2018

(65) Prior Publication Data

US 2019/0183056 A1 Jun. 20, 2019

(30) Foreign Application Priority Data

Dec. 20, 2017 (DE) .......................... 10 2017 223 375

(51) Int. Cl.
*A01F 12/56* (2006.01)
*A01F 7/06* (2006.01)
(Continued)

(52) U.S. Cl.
CPC ............ *A01F 12/56* (2013.01); *A01D 34/828* (2013.01); *A01D 43/08* (2013.01); *A01D 69/06* (2013.01);
(Continued)

(58) Field of Classification Search
CPC .... F16C 3/02; F16C 2310/00; F16C 2237/00; F16C 2361/61; F16C 33/6651;
(Continued)

(56) References Cited

U.S. PATENT DOCUMENTS 4,248,249 A  2/1981 Dunn et al.
4,400,930 A * 8/1983 Huhman ................. A01F 12/56
                                                            474/19
(Continued)

FOREIGN PATENT DOCUMENTS

DE            204020 A5    11/1983
DE         10322642 A1    12/2004
(Continued)

OTHER PUBLICATIONS

European Search Report issued in counterpart application No. 18212991.6 dated May 14, 2019. (5 pages).
(Continued)

*Primary Examiner* — Arpad Fabian-Kovacs

(57) ABSTRACT

An agricultural machine includes at least one processing device for harvested material and a drive train for the at least one processing device. The drive train has an output transmission stage with an output shaft for the at least one processing device. The output transmission stage includes an input gear and a grooved shaft connected in a non-rotatable manner to the input gear and the output shaft in such a manner that a drive connection between the input gear and the output shaft is achieved via the grooved shaft. The grooved shaft is provided with a ring groove defining a predetermined breaking point. The ring groove is configured in the drive flow direction between the input gear and the output shaft, and the grooved shaft is accessible through an assembly opening on an input gear side of the grooved shaft. The assembly opening is axially aligned with the grooved shaft.

12 Claims, 4 Drawing Sheets

(51) Int. Cl.
*F16C 3/02* (2006.01)
*F16H 1/20* (2006.01)
*A01D 43/08* (2006.01)
*A01D 34/82* (2006.01)
*A01D 69/06* (2006.01)
*A01D 41/02* (2006.01)
*F16H 35/10* (2006.01)

(52) U.S. Cl.
CPC ............... *A01F 7/06* (2013.01); *F16C 3/02* (2013.01); *F16H 1/203* (2013.01); *A01D 41/02* (2013.01); *F16C 2237/00* (2013.01); *F16C 2310/00* (2013.01); *F16H 2035/103* (2013.01)

(58) Field of Classification Search
CPC .... F16H 1/203; F16H 2035/103; F16H 35/10; F16H 2055/366; F16H 55/36; F16H 2048/085; F16H 37/0806; A01F 12/56; A01F 7/06; A01D 34/828; A01D 69/06; A01D 43/08; A01D 41/02; A01D 69/00; A01D 41/12; F16D 9/06; F16D 2001/103; F16D 2001/062; F16D 9/08
See application file for complete search history.

(56) References Cited

U.S. PATENT DOCUMENTS

| | | | |
|---|---|---|---|
| 4,454,787 A | 6/1984 | Love et al. | |
| 4,483,128 A | 11/1984 | Hawkins | |
| 4,552,547 A * | 11/1985 | Carnewal | A01D 41/12 474/101 |
| 4,932,280 A | 6/1990 | Becker et al. | |
| 5,518,466 A * | 5/1996 | Tiedeman | F16H 35/10 475/342 |
| 8,313,408 B1 * | 11/2012 | Langenfeld | F16H 37/0813 475/230 |
| 2001/0016529 A1 * | 8/2001 | Kawachi | F16H 55/36 474/94 |
| 2005/0209009 A1 * | 9/2005 | Son | F16H 55/36 464/32 |
| 2012/0186930 A1 * | 7/2012 | Salvia | A01D 34/828 192/66.31 |
| 2013/0172090 A1 * | 7/2013 | Mizoguchi | F16H 48/08 475/230 |
| 2015/0110429 A1 * | 4/2015 | Krause | F16C 33/7813 384/473 |
| 2015/0226271 A1 * | 8/2015 | Nelson | F16D 9/06 403/2 |
| 2016/0076599 A1 * | 3/2016 | Bell | F16H 35/10 29/525.11 |
| 2017/0251596 A1 * | 9/2017 | Stephenson | A01D 34/665 |
| 2020/0077582 A1 * | 3/2020 | Xu | A01D 41/127 |

FOREIGN PATENT DOCUMENTS

| | | |
|---|---|---|
| EP | 0826902 A2 | 3/1998 |
| EP | 2280191 A2 | 2/2011 |
| WO | 9009314 A1 | 8/1990 |

OTHER PUBLICATIONS

German Search Report issued in counterpart application No. 102017223375.3 dated Aug. 29, 2018. (10 pages).

* cited by examiner

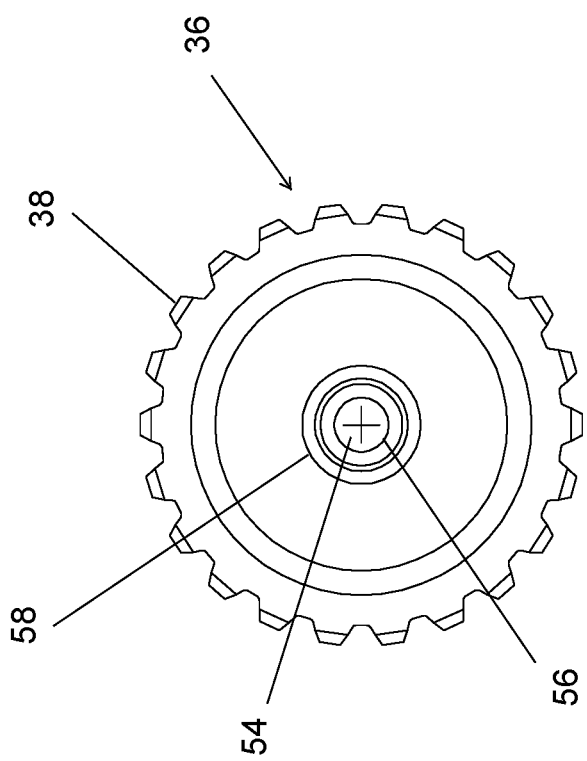
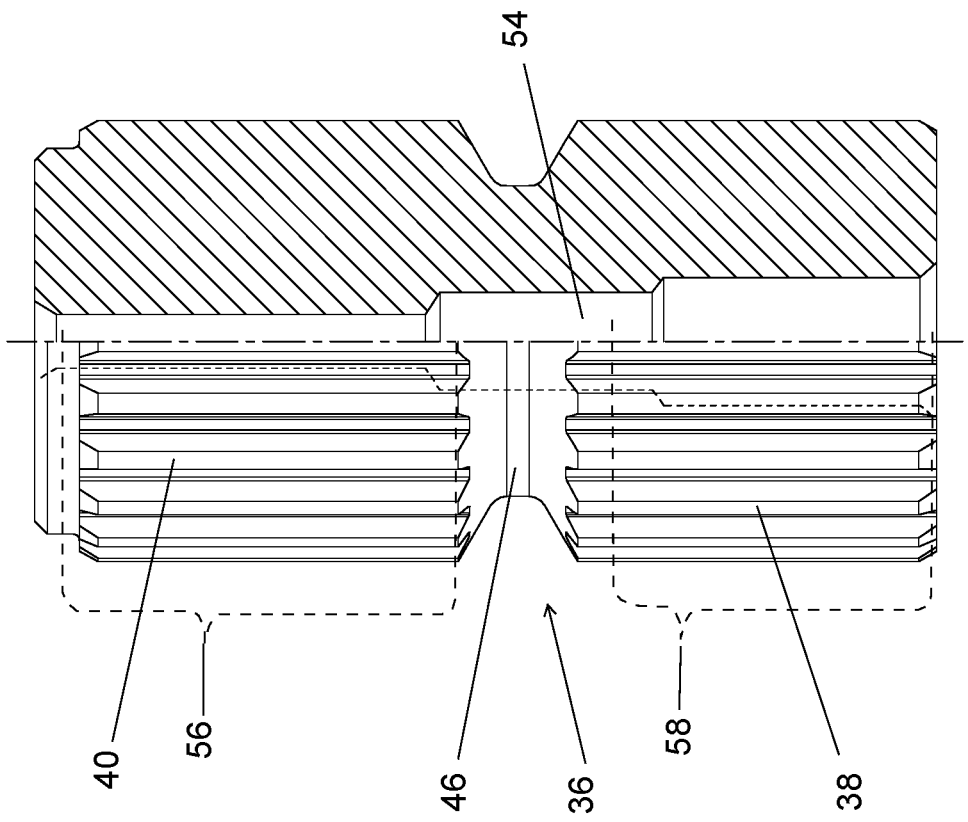

AGRICULTURAL MACHINE AND GROOVED SHAFT

RELATED APPLICATION

This application claims priority under 35 U.S.C. § 119 to German patent application DE 102017223375.3, filed Dec. 20, 2017, the disclosure of which is incorporated herein by reference in its entirety.

BACKGROUND

Agricultural machines, in particular harvesters with processing devices for the harvested material drawn up, are known in the prior art. These include, for example, combine harvesters, field choppers or also sugar cane harvesters or also other harvesting machines which provide processing for harvested material received in the machine. This means that during the harvesting of the harvested material threshing, chopping, cutting or another kind of processing can be provided within the harvested material flow, wherein a drive unit can be provided for the processing device, the drive unit including an intermediate transmission which is provided with overload protection to safeguard against overloading. The overload protection may be equipped with a torsional safety device in the form of a shear bolt, slip clutch or another kind of overload protection. The mechanism of a slip clutch is usually unfavorable on account of its structural complexity and susceptibility to wear. An arrangement of shear bolts likewise requires complex maintenance work. If, due to overloading of the drive unit, the shear bolts should shear off, repair work is generally very costly and usually requires the drive unit to be dismantled and the shear bolt replaced. The dismantling of the drive unit, in particular, is cost-intensive and extremely time-consuming.

A harvesting machine of this kind is disclosed in U.S. Pat. No. 4,248,249 A, for example. In this case, an axial-flow combine harvester with a cutting attachment is described for cutting and feeding harvested material. The harvested material is supplied in the form of cut material to a threshing and separating system, wherein the system includes a housing in which the cut material is received and a rotor in the housing for threshing and separating the grain from the cut material. The rotor has a rotor axle which is driven by a gear in the rear region of the rotor, wherein the gear includes an input and an output shaft and the output shaft drives the rotor. The transmission is hard to access in any case, and if the shear pin acting as the overload safety device in the transmission were to shear off, the complete dismantling of the transmission would be required for repair and maintenance.

SUMMARY

Various aspects of embodiments of the present disclosure are set out in the claims.

In accordance with an embodiment of the present disclosure, an agricultural machine includes at least one processing device for harvested material and a drive train for the at least one processing device. The drive train has an output transmission stage with an output shaft for the at least one processing device. The output transmission stage includes an input gear and a grooved shaft connected in a non-rotatable manner to the input gear and the output shaft in such a manner that a drive connection between the input gear and the output shaft is achieved via the grooved shaft. The grooved shaft is provided with a ring groove defining a predetermined breaking point, the ring groove being configured in the drive flow direction between the input gear and the output shaft, and the grooved shaft being accessible through an assembly opening on an input gear side of the grooved shaft, the assembly opening being configured on a housing wall surrounding the drive train, and the assembly opening being axially aligned with the grooved shaft.

In accordance with an embodiment of the present disclosure, a grooved shaft of an output transmission stage of a drive train for at least one processing device of harvested material in an agricultural machine is provided. The output transmission stage has an output shaft for the at least one processing device and an input gear connected in a non-rotatable manner to the grooved shaft and the output shaft in such a manner that a drive connection between the input gear and the output shaft is achieved via the grooved shaft. The grooved shaft includes a ring groove defining a predetermined breaking point. The ring groove is configured in the drive flow direction between the input gear and the output shaft. The grooved shaft is configured to be accessible through an assembly opening on an input gear side of the grooved shaft. The assembly opening is configured on a housing wall surrounding the drive train. The grooved shaft is configured to be axially aligned with the assembly opening.

The above and other features will become apparent from the following description and accompanying drawings.

BRIEF DESCRIPTION OF THE DRAWINGS

The detailed description of the drawings refers to the accompanying figures in which:

FIG. 4a shows a first cross-sectional representation of a grooved shaft of the output transmission stage from FIG. 3 in accordance with an embodiment of the present disclosure; and FIG. 4b illustrates a front side view of the grooved shaft from FIG. 4a in accordance with an embodiment of the present disclosure.

Like reference numerals are used to indicate like elements throughout the several figures.

DETAILED DESCRIPTION

Figure 1:
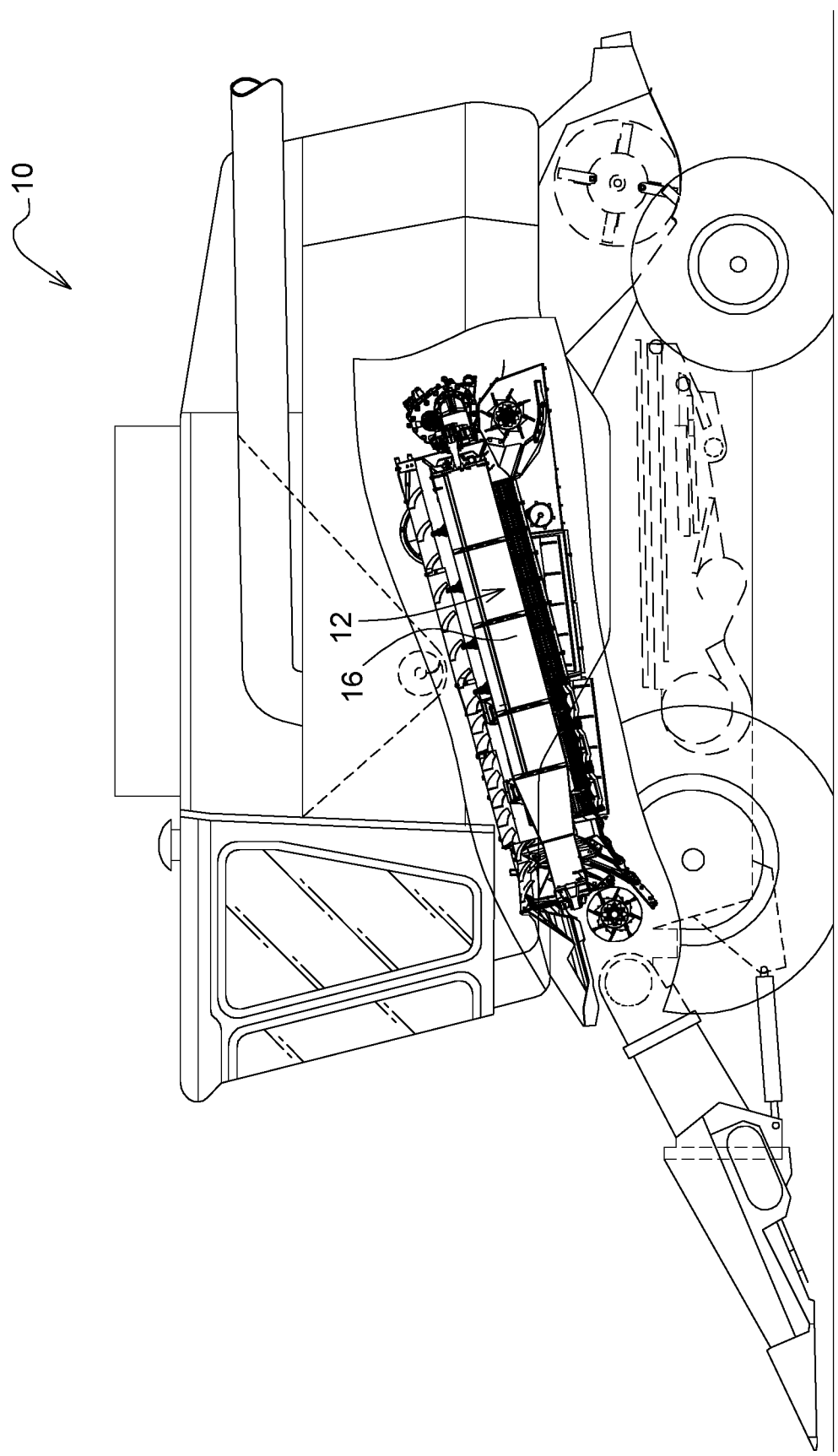
FIG. 1 illustrates a schematic cross-sectional side view of an agricultural machine in accordance with an embodiment of the present disclosure.

At least one embodiment of the subject matter of this disclosure is understood by referring to FIGS. 1 through 4b of the drawings.

According to the disclosure, an agricultural machine of the kind referred to above is configured in such a manner that the grooved shaft is provided with a ring groove defining a predetermined breaking point, wherein the ring groove is configured in the drive flow direction between the input gear and the output shaft and the grooved shaft is accessible through an assembly opening on the input gear side which is configured on a housing wall surrounding the drive train, axially aligned with the grooved shaft. The assembly opening allows the grooved shaft to be replaced if it shears off due to overloading. The assembly opening guarantees access and a necessary assembly clearance, so that quick, low-cost repairs or a quick, low-cost replacement of the grooved shaft can take place. In particular, it is possible for the repair or replacement of the grooved shaft to be undertaken without dismantling or exposing the rest of the drive train or essential parts thereof.

Internal toothing is provided on the input gear and on the output shaft, wherein the internal toothing formed on the input gear is configured as continuous internal toothing and both sets of internal toothing are axially aligned with one another and wherein the grooved shaft connects both sets of internal toothing to one another according to the drive flow. The internal toothing provided in the input gear consequently also supplies an opening facing the assembly opening and, in addition, simplifies the replacement of the grooved shaft or makes access to the grooved shaft easier during use and/or replacement.

The ring groove configured on the grooved shaft or also the annular recess or notch is formed between the sets of internal toothing, so that a shearing-off or breakage at this point leads to the drive being interrupted between the input gear and the output shaft.

A threaded bore extending in the longitudinal direction of the grooved shaft may be formed in the grooved shaft, which threaded bore can be used for assembly or repair purposes, so that parts or halves of the grooved shaft remaining in the inner bores can be gripped and pulled out in the event of a shearing-off or breakage, for example.

A part of the threaded bore extending downstream of the ring groove according to the drive flow may have a smaller diameter than a part of the threaded bore extending upstream of the ring groove according to the drive flow. In this way, it is made easier, for example, for the threaded bore with the smaller diameter not to be deformed or damaged during a shearing action, so that the access and advantageous use of the threaded bore in the region of both diameters is guaranteed. The threaded bores in this case should facilitate the screwing-in of a threaded bolt for removing the remaining parts of the grooved shaft in the inner bores for assembly purposes or when replacing a sheared-off or broken grooved shaft.

A processing device of the kind described above may, for example, be provided in harvesting machines, in particular in combine harvesters, corn pickers, sugar cane harvesters, mowing machines or field choppers, wherein the processing device may be configured as a chopping device, cutting device or threshing device. It is also conceivable for a plurality of processing mechanisms to be operated in parallel, for example two threshing drums or threshing rotors arranged alongside one another. It is possible for a separate output transmission stage to be provided for each of these processing mechanisms, wherein a power-split transmission is inserted upstream of the output transmission stages in the drive train, for example.

Figure 2:
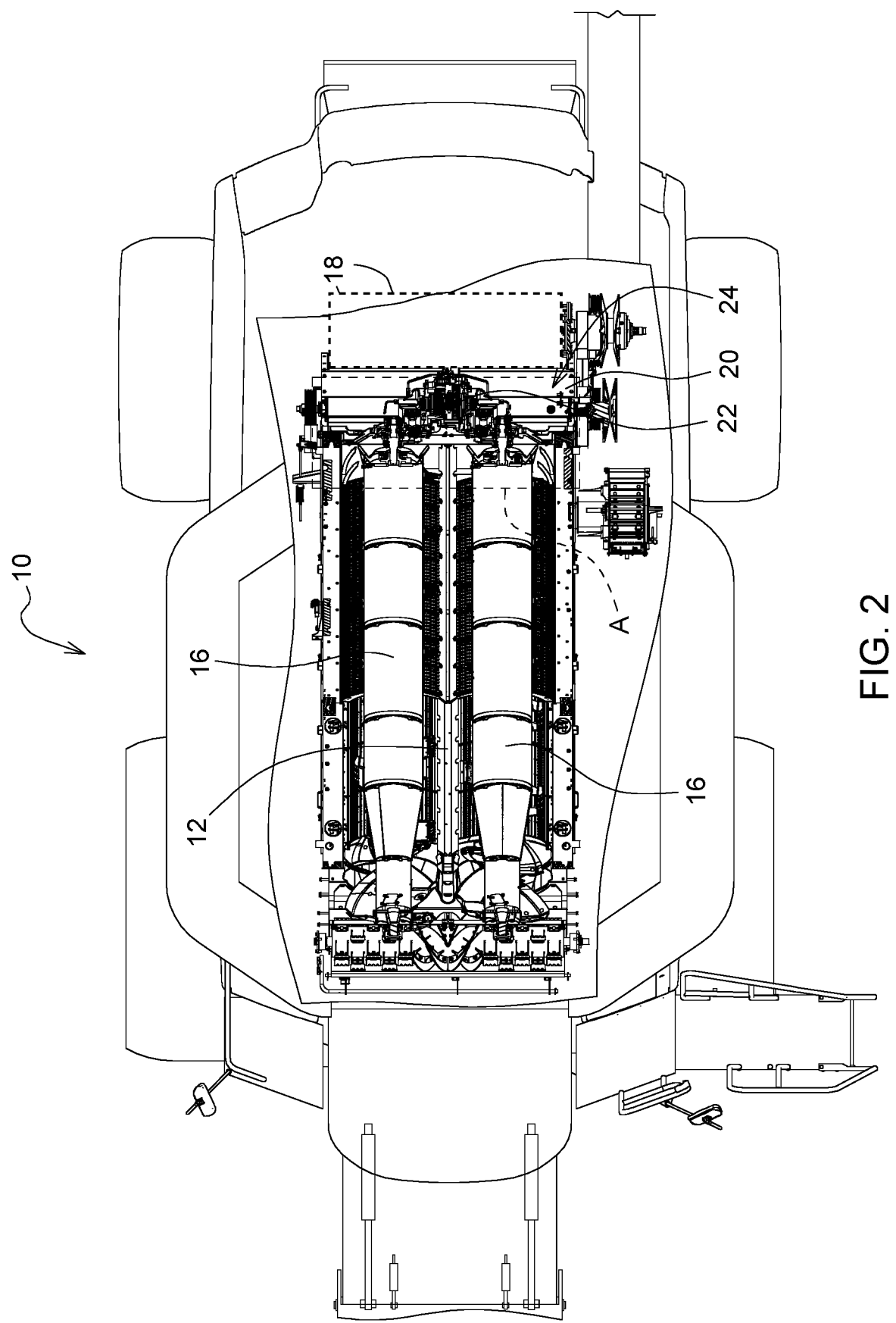
FIG. 2 illustrates a schematic cross-sectional plan view of the agricultural machine from FIG. 1 in accordance with an embodiment of the present disclosure.

FIG. 1 and FIG. 2 show a self-driving agricultural machine 10 which is designed in the form of a combine-harvester, for example. It is also entirely conceivable that the exemplary embodiment further described below can also be configured on another kind of self-driving agricultural machine, for example a field chopper, a mowing machine, a sugar cane harvester, a bale press or a field sprayer.

Figure 3:
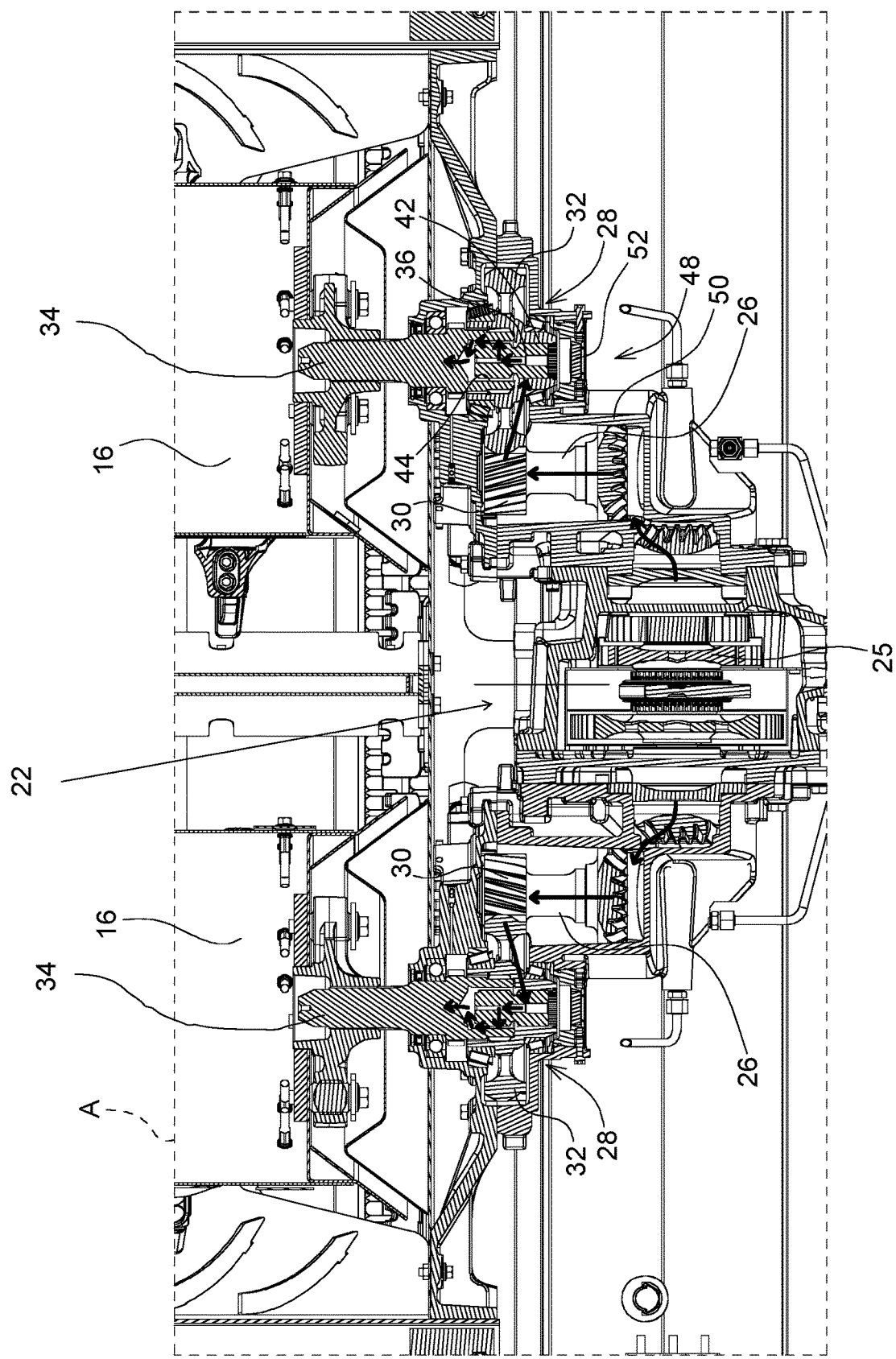
FIG. 3 illustrates an enlarged cross-sectional view of part of the drive train with output transmission stage from FIG. 2 in accordance with an embodiment of the present disclosure.

The agricultural machine 10 has a processing device 12 in the form of a threshing device with two axial rotors 16 oriented in the longitudinal direction of the agricultural machine 10. The agricultural machine 10 is driven by an internal combustion engine 18 (only depicted schematically). The internal combustion engine 18 is connected to a belt transmission 20 on the output side, which in turn drives an intermediate transmission 22. The belt drive 20 and intermediate transmission 22 in this case create a drive train 24 for the processing device 12. As can be identified more accurately in FIG. 3, the intermediate transmission 22 has a power-split transmission stage 25 which facilitates a drive for a threshing device with two axial rotors 16, wherein an output shaft 26 is provided for each of the axial rotors 16 which is connected in each case for drive purposes to an output transmission stage 28. The drive flow direction in the power-split transmission stage 25 and also in the output transmission stage 28 is indicated in FIG. 3 by the arrangement of arrows. The output shaft 26 in each case represents an output of the intermediate transmission 22 and is drive-connected via output toothing 30 to an input gear 32 of the respective output transmission stage 28. The output transmission stages 28 in each case are substantially identical in design, as described below.

Each of the output transmission stages 28 has an output shaft 34 for the respective axial rotors 16 of the processing device 12, wherein the output shaft 34 is connected in a non-rotatable manner via a grooved shaft 36 in each case to the input gear 32 of the output transmission stage 28, in such a manner that a drive connection between the input gear 32 and the output shaft 34 takes place via the grooved shaft 36.

The grooved shaft 36 of an output transmission stage 28 in each case is depicted in detail in FIGS. 4a and 4b. The grooved shaft 36 has external toothing 38 on the input side and external toothing 40 on the output side, wherein the external toothing 38 on the input side meshes with internal toothing 42 formed on the input gear 32 and the external toothing 40 on the output side meshes with internal toothing 44 formed on the output shaft 34.

Between the external toothing 38, 40 of the grooved shaft 36 on the input side and the output side is formed a ring groove 46 which represents a predetermined breaking point in the event of the grooved shaft 36 being overloaded.

The internal toothing 42 formed on the input gear 32 is configured as continuous internal toothing. In addition, on each of the output transmission stages 28 there is an assembly opening 48 which is formed in a housing wall 50 surrounding the drive train 24 and the output transmission stages 28, axially aligned with the respective grooved shaft 36. The assembly opening 48 is closed by a cover 52 and allows direct access to the internal toothing 42 of the respective input gear 32 for assembly purposes, and therefore to a respective front face of the grooved shaft 36 on the input gear side, by removing the cover 52.

In addition, a threaded bore 54 extending in the longitudinal direction of the grooved shaft 36 is formed in the grooved shaft 36, wherein in a part 56 of the grooved shaft 36 extending downstream of the ring groove 46 in the drive flow direction, the threaded bore 54 exhibits a smaller diameter than in a part 58 of the threaded bore 54 extending upstream of the ring groove 46 in the drive flow direction.

The processing device 12 may be configured as a threshing device, a chopping device or a cutting device. Processing devices of this kind are occasionally exposed to high torque loads, in particular when foreign bodies or too much harvested material reaches the processing device 12. In order to avoid more serious damage, in particular in the drive train and/or on the axial rotors 16, a predetermined breaking point for shearing-off or breakage of the grooved shaft 36 should be created by the ring groove 46 formed in the grooved shaft 36 for the event of an overload. If there should be a breakage of this kind of the grooved shaft 36, the assembly opening 48 allows direct access to the grooved shaft, so that complex work requiring the entire drive train 24 to be opened and, in particular, the dismantling of the same, are precluded. Downtime and repair times can thereby be minimized.

The threaded bore 54 formed in the grooved shaft 36 means that following an overload breakage of the grooved shaft 36, a matching threaded pin (not shown) can be screwed into the threaded bores 54 of the respective halves of the broken or sheared-off grooved shaft 36 and the respective halves of the grooved shaft can be pulled out. In this case, the different diameters in the threaded bore 54 mean that the thread in the part 56 lying downstream of the ring groove 46 on the drive side which has a smaller diameter than the thread in the part 58 lying upstream of the ring groove 46 on the drive side is undamaged, even following the breakage of the grooved shaft 36.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment (s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. An agricultural machine comprising:
   at least one processing device for harvested material;
   a drive train for the at least one processing device;
   wherein the drive train has an output transmission stage with an output shaft for the at least one processing device;
   wherein the output transmission stage comprises an input gear and a grooved shaft connected in a non-rotatable manner to the input gear and the output shaft in such a manner that a drive connection between the input gear and the output shaft is achieved via the grooved shaft; and
   wherein the grooved shaft is provided with a ring groove defining a predetermined breaking point, the ring groove being configured in the drive flow direction between the input gear and the output shaft, and the grooved shaft being accessible through an assembly opening on an input gear side of the grooved shaft, the assembly opening being configured on a housing wall surrounding the drive train, and the assembly opening being axially aligned with the grooved shaft.

2. The agricultural machine according to claim 1, wherein internal toothing is provided on the input gear and on the output shaft, wherein the internal toothing formed on the input gear is configured as continuous internal toothing, and both sets of internal toothing are axially aligned with one another, and wherein the grooved shaft connects both sets of internal toothing to one another in the drive flow direction.

3. The agricultural machine according to claim 2, wherein the ring groove is configured between the sets of internal toothing.

4. The agricultural machine according to claim 1, wherein a threaded bore extending in a longitudinal direction of the grooved shaft is formed in the grooved shaft.

5. The agricultural machine according to claim 4, wherein a part of the threaded bore extending downstream of the ring groove in the drive flow direction has a smaller diameter than a part of the threaded bore extending upstream of the ring groove in the drive flow direction.

6. The agricultural machine according to claim 1, wherein the at least one processing device is configured as one of a threshing device, a chopping device, and a cutting device.

7. A grooved shaft of an output transmission stage of a drive train for at least one processing device of harvested material in an agricultural machine, the output transmission stage having an output shaft for the at least one processing device and an input gear connected in a non-rotatable manner to the grooved shaft and the output shaft in such a manner that a drive connection between the input gear and the output shaft is achieved via the grooved shaft, the grooved shaft comprising:
   a ring groove defining a predetermined breaking point, the ring groove being configured in the drive flow direction between the input gear and the output shaft;
   wherein the grooved shaft is configured to be accessible through an assembly opening on an input gear side of the grooved shaft;
   wherein the assembly opening is configured on a housing wall surrounding the drive train; and
   wherein the grooved shaft is configured to be axially aligned with the assembly opening.

8. The grooved shaft according to claim 7, wherein internal toothing is provided on the input gear and on the output shaft, wherein the internal toothing formed on the input gear is configured as continuous internal toothing, and both sets of internal toothing are axially aligned with one another, and wherein the grooved shaft is configured to connect both sets of internal toothing to one another in the drive flow direction.

9. The grooved shaft according to claim 8, wherein the ring groove is configured to be disposed between the sets of internal toothing.

10. The grooved shaft according to claim 7, further comprising:
    a threaded bore extending in a longitudinal direction of the grooved shaft.

11. The grooved shaft according to claim 10, wherein a part of the threaded bore extending downstream of the ring groove in the drive flow direction has a smaller diameter than a part of the threaded bore extending upstream of the ring groove in the drive flow direction.

12. The agricultural machine according to claim 7, wherein the at least one processing device is configured as one of a threshing device, a chopping device, and a cutting device.

\* \* \* \* \*